United States Patent [19]

Minchak et al.

[11] 4,025,708

[45] May 24, 1977

[54] PROCESS FOR POLYMERIZING CYCLOPENTENE

[75] Inventors: Robert J. Minchak, Parma Heights; Robert E. Beauregard, Copley, both of Ohio

[73] Assignee: The B. F. Goodrich Company, Akron, Ohio

[22] Filed: Mar. 24, 1975

[21] Appl. No.: 561,500

[52] U.S. Cl. .............................. 526/142; 526/139; 526/143; 526/283; 526/916
[51] Int. Cl.² .............. C08F 210/00; C08F 212/00
[58] Field of Search ................... 260/80.78, 93.1; 526/137, 169, 213, 214, 283, 308, 142, 143, 916

[56] References Cited

UNITED STATES PATENTS

| | | | |
|---|---|---|---|
| 3,074,918 | 1/1963 | Eleuterio | 260/93.1 |
| 3,597,403 | 8/1971 | Ofstead | 260/88.2 |
| 3,684,781 | 8/1972 | Nutzel et al. | 260/80.78 |
| 3,687,921 | 8/1972 | Oberkirch et al. | 260/88.2 R |
| 3,790,543 | 2/1974 | Lehnert et al. | 260/93.1 |
| 3,790,545 | 2/1974 | Minchak | 260/93.1 |
| 3,853,830 | 12/1974 | Minchak | 260/88.2 |

OTHER PUBLICATIONS

Truett et al., *J. Amer. Chem. Soc.*, 1960, 82, 2337–2340.
Rinehart in "Polymer Chemistry of Synthetic Elastomers"–Part II, Interscience, New York (1969) – pp. 880–882.

*Primary Examiner*—Joseph L. Schofer
*Assistant Examiner*—A. L. Clingman
*Attorney, Agent, or Firm*—Charles A. Crehore

[57] ABSTRACT

Cyclopentene homopolymers and copolymers are prepared by polymerizing cyclopentene alone or with one or more copolymerizable cycloolefins in the presence of (1) a catalyst comprising (a) at least one compound selected from the group consisting of dialkylaluminum iodides, alkylaluminum diiodides and mixtures of trialkylaluminum compounds with elemental iodine and (b) at least one solvent-soluble tungsten compound, (2) at least one nonconjugated acyclic olefin having at least one hydrogen on each double-bonded carbon atom, and (3) a solvent for the tungsten compound comprising at least one alkyl ester of a saturated carboxylic or dicarboxylic acid. Catalyst component (a) is charged before catalyst component (b). Use of the ester solvent causes a brief induction period allowing excellent process control and resulting in substantially gel-free polymers.

10 Claims, No Drawings

PROCESS FOR POLYMERIZING CYCLOPENTENE

BACKGROUND OF THE INVENTION

Preparation of polypentenamers is well known using a catalyst comprising an organoaluminum compound and a tungsten salt (U.S. Pat. No. 3,790,545). It is known that 1-olefins may be used to adjust molecular weight of polypentenamers (U.S. Pat. No. 3,684,781). The prior art also teaches use of alkanes, cycloalkanes and aromatics as suitable polymerization solvents. Prior art reactions begin instantaneously upon mixing of monomer and the complete catalyst, making difficult the exact control of polymer uniformity. Thus prior art polymers often contain substantial amounts of gel and are often difficult to remove from polymerization vessels. A new polymerization process is desired having a brief induction period to allow better process control and production of substantially gel-free polymers.

SUMMARY OF THE INVENTION

Cyclopentene homopolymers and copolymers are prepared by polymerizing cyclopentene alone or with one or more copolymerizable cycloolefins in the presence of (1) a catalyst comprising (a) at least one compound selected from the group consisting of dialkylaluminum iodides, alkylaluminum diiodides and mixtures of trialkylaluminum diiodides and mixtures of trialkylaluminum compounds with elemental iodide and (b) at least one solvent-soluble tungsten compound, (2) at least one nonconjugated acyclic olefin having at least one hydrogen on each double-bonded carbon atom, and (3) a solvent for the tungsten compound comprising at least one alkyl ester of a saturated carboxylic or dicarboxylic acid. Catalyst component (a) is charged before catalyst component (b).

DETAILED DESCRIPTION

Cyclopentene is homopolymerized by the process of this invention to a linear, unsaturated polypentenamer of predominantly cis- or trans- structure depending in part upon the polymerization temperature (see U.S. Pat. No. 3,790,545). Cyclopentene can also be copolymerized by the process of this invention with from about 0% to about 98% by weight of at least one other copolymerizable cycloolefin, more preferably from about 50% to about 98% by weight, and even more preferably from about 65% to about 98% by weight, of the copolymerizable cycloolefin, based upon total polymer weight. Examples of suitable copolymerizable cycloolefins include monocyclic monoolefins and diolefins containing from 4 to 12 carbon atoms, more preferably from 4 to 8 carbon atoms, such as cyclobutene, cyclopentadiene, cycloheptene, cyclooctene, 1,5-cyclooctadiene, cyclodecene and the like. Also suitable are bicyclic olefins containing from 7 to 16 carbon atoms and from 1 to 4 double bonds, more preferably from 8 to 12 carbon atoms and 2 or 3 double bonds. Examples of such bicyclic olefins include 2-norbornene, 5-methyl-2-norbornene, 2-methyl-2,5-norbornadiene, dicyclopentadiene, and the like. 2-norbornene and dicyclopentadiene are more preferred. Excellent results were obtained using dicyclopentadiene.

The alkylaluminum iodide compounds are selected from the group consisting of dialkylaluminum iodides and alkylaluminum diiodides wherein each alkyl group contains from 2 to 8 carbon atoms, more preferably from 2 to 4 carbon atoms, such as diethylaluminum iodide, ethylaluminum diiodide, propylaluminum diiodide, ethylpropylaluminum iodide, and the like. A mixture of a trialkylaluminum compound and iodine may also be used wherein each alkyl group contains from 2 to 8 carbon atoms, more preferably from 2 to 4 carbon atoms, such as a mixture of triethylaluminum and iodine and the like. Other organoaluminum and organoaluminum halide compounds have been found to be unsuitable in the present invention. These compounds include trialkylaluminum compounds used without iodine such as triethylaluminum and the like, and dialkylaluminum halides and alkylaluminum dihalides wherein the halogen is selected from the group consisting of fluorine, chlorine, and bromine, such as diethylaluminum chloride, ethylaluminum dichloride, diethylaluminum bromide, diethylaluminum fluoride, and the like.

The tungsten compounds used in this invention are soluble in the ester solvents described hereinafter. Suitable tungsten compounds include tungsten carbonyl [$W(CO)_6$], tungsten oxytetrachloride, and the like. Also suitable and more preferred are tungsten halides, which include chlorides, bromides, iodides and fluorides such as tungsten hexachloride, tungsten hexafluoride and the like. Excellent results were obtained using tungsten hexachloride.

The alkylaluminum iodide or trialkylaluminum compound is employed at a level from about 0.1 to about 10 millimoles, more preferably from about 0.1 to about 0.5 millimole per mole of total cyclopentene and copolymerizable cycloolefin. The alkylaluminum iodide or trialkylaluminum compound is used in a catalytically effective molar ratio to tungsten compound from about 1 to about 80 moles per mole, more preferably from about 1 to about 50 moles per mole. The elemental iodine is used in a range from about 0.25 mole to about 6 moles of elemental iodine per mole of trialkylaluminum compound, more preferably from about 0.5 to about 3 moles per mole. The catalyst components may be charged directly or in solution, but the alkylaluminum iodide or mixture of trialkylaluminum and iodide must be charged before the tungsten compound.

At least one nonconjugated acyclic olefin is used having at least one hydrogen on each double-bonded carbon atom and containing 2 to 12 carbon atoms, more preferably 2 to 8 carbon atoms. Inert substituents on the remaining carbon atoms are selected from the group consisting of hydrogens and alkyl groups containing 2 to 8 carbon atoms. Examples of suitable compounds include 1-olefins such as 1-butene, 3-methyl-1-butene, and the like; 2-olefins such as 2-pentene, 4-methyl-2-pentene and the like; 3-olefins such as 5-ethyl-3-octene and the like; nonconjugated diolefins such as 1,6-hexadiene and the like; nonconjugated triolefins such as 1,4,7-octatriene and the like; and like compounds. More preferably the nonconjugated acyclic olefin is selected from the group consisting of 1-olefins and 2-olefins containing 2 to 8 carbon atoms such as 1-butene, 3-methyl-1-butene, 2-pentene, 4-methyl-2-pentene and the like. Compounds not having at least one hydrogen atom on each double-bonded carbon are unreactive in this invention, and conjugated olefins such as butadiene, isoprene and the like are active inhibitors.

The nonconjugated acyclic olefin is used in a molar ratio to total cyclopentene and copolymerizable cycloolefin from about 0.0001 to about 0.3 mole per mole. The nonconjugated acyclic olefin may be charged directly or in solution at any point in the charge procedure, but it is more preferably charged along with the monomers. When charged last, the nonconjugated acyclic olefin preferably is charged before reaction begins.

The solvent for the tungsten compound comprises at least one alkyl ester of a saturated carboxylic or dicarboxylic acid. The solvent contains from 2 to 20 carbon atoms and may be substituted only by 0 to 3, preferably 0 or 1, halogen atoms, preferably bromine or chlorine. More preferably the solvent contains from 2 to 10 carbon atoms and 0 or 1 bromine or chlorine atoms, even more preferably 2 to 5 carbon atoms and 0 or 1 bromine or chlorine atoms. The solvent should be liquid under a given set of reaction conditions in order to dissolve the tungsten compound described heretofore. Sufficient ester solvent is used to produce a tungsten compound solution at a concentration from about 0.01 molar to about 1.0 molar. Examples of suitable alkyl esters of saturated carboxylic or dicarboxylic acids where the esters contain from 2 to 20 carbon atoms and are substituted by 0 to 3 halogen atoms include methyl formate, ethyl formate, methyl chloroformate, ethyl chloroformate, butyl chloroformate, methyl acetate, ethyl acetate, isopropyl acetate, n-propyl acetate, n-butyl acetate, sec-butyl acetate, t-butyl acetate, isoamyl acetate, n-amyl acetate, hexyl acetate, methyl bromoacetate, ethyl bromoacetate, t-butyl bromoacetate, ethyl chloroacetate, methyl propionate, ethyl propionate, ethyl 2-bromopropionate, ethyl 3-bromopropionate, methyl 2-chloropropionate, ethyl butyrate, ethyl 2-bromobutyrate, ethyl 4-bromobutyrate, ethyl 2-bromoisobutyrate, methyl 4-chlorobutyrate, ethyl 4-chlorobutyrate, ethyl isovalerate, methyl 5-bromovalerate, ethyl 2-bromovalerate, ethyl 5-bromovalerate, methyl 5-chlorovalerate, ethyl caproate, ethyl octanoate, ethyl decanoate, ethyl laurate, diethyl oxalate, dimethyl malonate, diethyl malonate, diethyl methylmalonate, diethyl ethylmalonate, diethyl n-butylmalonate, diethyl dimethylmalonate, diethyl diethylmalonate, diethyl bromomalonate, diethyl chloromalonate, diethyl succinate, diethyl glutarate, diethyl pimelate, diethyl suberate, adipic acid monomethyl ester, and the like.

Examples of more preferred solvents containing from 2 to 10 carbon atoms and 0 to 1 bromine or chlorine atoms include methyl formate, ethyl formate, methyl chloroformate, ethyl chloroformate, butyl chloroformate, methyl acetate, ethyl acetate, isopropyl acetate, n-propyl acetate, n-butyl acetate, sec-butyl acetate, t-butyl acetate, isoamyl acetate, n-amyl acetate, hexyl acetate, methyl bromoacetate, ethyl bromoacetate, t-butyl bromoacetate, ethyl chloroacetate, methyl propionate, ethyl propionate, ethyl 2-bromopropionate, ethyl 3-bromopropionate, methyl 2-chloropropionate, ethyl butyrate, ethyl 2-bromobutyrate, ethyl 4-bromobutyrate, ethyl 2-bromoisobutyrate methyl 4-chlorobutyrate, ethyl 4-chlorobutyrate, ethyl isovalerate, methyl 5-bromovalerate, ethyl 2-bromovalerate, ethyl 5-bromovalerate, methyl 5-chlorovalerate, ethyl caproate, ethyl octanoate, diethyl oxalate, dimethyl malonate, diethyl malonate, diethyl methylmalonate, diethyl ethylmalonate, diethyl dimethylmalonate, diethyl bromomalonate, diethyl chloromalonate, diethyl succinate, diethyl glutarate, adipic acid monomethyl ester, and the like.

Examples of even more preferred solvents containing from 2 to 5 carbon atoms and 0 or 1 bromine or chlorine atoms include methyl formate, ethyl formate, methyl chloroformate, ethyl chloroformate, butyl chloroformate, methyl acetate, ethyl acetate, isopropyl acetate, n-propyl acetate, methyl bromoacetate, ethyl bromoacetate, ethyl chloroacetate, methyl propionate, ethyl propionate, ethyl 2-bromopropionate, ethyl 3-bromopropionate, methyl 2-chloropropionate, dimethyl malonate, and the like. Excellent results were obtained with ethyl acetate.

Surprisingly, use of the above ester solvents causes a brief induction period from about 1 to about 5 minutes and allows addition of all components of the reaction mixture before substantial polymerization begins. The result is uniform process control and, ultimately, substantially gel-free polymers. The ester solvents are also substantially better tungsten compound solvents than prior art solvents described heretofore.

The above ester solvents may be used together with at least one inert cosolvent. The cosolvent may constitute from 0% to about 90% by weight of the total catalyst solvent weight. Additional cosolvent may also be used during polymerization. The additional cosolvent may be up to about 1000 times and more, preferably up to about 500 times, the total catalyst solvent weight. Suitable inert cosolvents include aliphatic or cycloaliphatic hydrocarbon cosolvents containing 4 to 10 carbon atoms such as pentane, hexane, heptane, octane, cyclohexane, cyclooctane and the like; aromatic hydrocarbon cosolvents containing 6 to 14 carbon atoms and which are liquid or easily liquified such as benzene, toluene, naphthalene and the like; and substituted hydrocarbons wherein the substituents are inert, such as dichloromethane, chloroform, chlorobenzene and the like. Benzene and toluene were found to be excellent cosolvents.

A polymerization activator may be used but is not generally needed. Examples of activators include water, methanol, ethanol, isopropyl alcohol, benzyl alcohol, phenol, ethyl mercaptan, 2-chloroethanol, 1,3-dichloropropanol, p-bromophenol, epichlorohydrin, ethylene oxide, cyclopentene-2-hydroperoxide, cumyl hydroperoxide, tertiary butyl peroxide, benzoyl peroxide, and air or oxygen. Excellent activation is obtained by using air or a peroxide or hydroperoxide as the activator, especially by using the organic peroxides such as benzoyl peroxide.

The activator may be employed in a range from about 0 moles to about 3 moles per mole of organoaluminum compound, more preferably from about 0 to about 1 mole per mole. The activator may be added at any point in the charge procedure, but it is more preferably added last, after the tungsten compound.

The monomers may be added at any point in the charging procedure. Normally, the monomers, solvent and nonconjugated acyclic olefin are added first to the reactor vessel. These ingredients may be added separately or as a mixture of ingredients. The alkylaluminum iodide compound or mixture of trialkylaluminum compound and elemental iodine is added next, usually as a solution in a cosolvent such as benzene described heretofore. The tungsten compound is added next as a solution in an ester solvent described heretofore, followed by the activator if used. The tungsten compound must be added after the alkylaluminum iodide compound or mixture of trialkylaluminum compound and elemental iodine.

Monomeric impurities such as water and the like should be removed prior to addition of the tungsten compound. The alkylaluminum iodide compound or mixture of trialkylaluminum compound and elemental iodine may be used to titrate the monomers or mixture of monomers and solvent until a color change from pink to colorless or slightly yellow is noted. A catalytically effective amount of alkylaluminum iodide compound or a mixture of trialkylaluminum compound and elemental iodine may then be added, followed by addition of the tungsten compound. The end point of the titration is typically difficult to pinpoint exactly. With minor impurities present, up to ten times the catalytically effect amount and more of the alkylaluminum iodide or mixture of trailkylaluminum compound and iodine may be required to render the impurities harmless.

The mixing of catalyst components and the reaction are preferably carried out in an inert atmosphere such as nitrogen and in the substantial absence of air or water. The reaction is conducted under sufficient pressure to keep the cyclopentene in liquid state, the pressure required depending upon the reaction temperature. The particular ester solvent system selected must be liquid under the reaction conditions used. Reaction temperature may be from about −50° C to about 100° C., more preferably from about 0° C to about 35° C. The polymerization may be shortstopped by addition of alcohols, amines or carboxylic acids such as ethanol, t-butyl phenol, diethylamine, acetic acid and the like.

The polymers may be isolated by any method known to the art such as by direct drying under reduced pressure, by precipitation using an alcohol such as methanol, ethanol, isopropanol and the like, or by steam or hot water stripping. The polymer is recovered and may be washed further with water or an alcohol and then dried.

The copolymers of this invention are high molecular products having an inherent viscosity from about 0.1 to about 10, more generally from about 0.5 to 5 and are greater than 90% soluble in a cosolvent such as benzene defined heretofore. Substantial insolubility indicates the presence of gel. By the inherent viscosity ($\eta_{inh}$) is meant a value obtained by dividing the natural logarithm of relative viscosity ($\eta_r$ = ratio of solution viscosity to solvent viscosity) by the concentration (c) being measured in grams of polymer per 100 milliliters of solvent at a given temperature, in this case 0.1 gram in 100 milliliters of toluene at 25° C:

$$\eta_{inh} = \frac{\ln \eta_r}{c} = \frac{\ln (\eta/\eta_0)}{c}$$

The inherent viscosity is regarded as a measure of molecular weight and is reported in units of deciliters/gram.

The following examples illustrate the present invention more fully.

EXAMPLE 1 – 4

A 0.147 molar WCl$_6$ solution was prepared under a nitrogen atmosphere by dissolving 5.8238 g. WCl$_6$ in a solution of 50 ml ethylacetate solvent and 50 ml benzene cosolvent. A second WCl$_6$ solution (0.047 molar) was also prepared under a nitrogen atmosphere by dissolving 3.1883 g. WCl$_6$ in 172 ml benzene. Cyclopentene was copolymerized with dicyclopentadiene by the following procedure. Glass reactor vessels were used. Each vessel was well-cleaned with soap and water, rinsed with acetone, heated in an oven at 140° C and thereafter flushed with nitrogen. Cyclopentene and dicyclopentadiene were mixed with benzene and charged to the reactor vessel. 1-Butene was added as a 2 volume percent solution in benzene. Diethylaluminum iodide (0.5 molar solution in benzene) was charged next, followed by a WCl$_6$ solution described heretofore. The polymerizations were performed at about 22° C and produced little heat. Little agitation was required for efficient polymerization. The reactions were shortstopped by addition of ethanol, and the polymers were precipitated and washed using ethanol. About 1 wt.% of di-t-butyl paracresol was added to the polymer as an antioxidant, and the polymer was dried in a vacuum oven at about 50° C. Percent yield was based upon the total weight of cyclopentene, dicyclopentadiene and 1-butene charged. The grams and moles of reactants, yields, percentages of dicyclopentadiene in polymers, inherent viscosities (IV) and % insolubilities of the polymers are set forth in Table I.

TABLE I

| EXAMPLES | 1 | 2 | 3 | 4 |
|---|---|---|---|---|
| Benzene, grams | 70.5 | 70.6 | 67.9 | 64.9 |
| moles | 0.90 | 0.90 | 0.87 | 0.83 |
| Cyclopentene, grams | 15.1 | 15.2 | 15.1 | 15.1 |
| millimoles | 221 | 223 | 221 | 221 |
| DCPD, grams | 3.0 | 5.8 | 2.7 | 2.9 |
| millimoles | 22 | 44 | 20 | 22 |
| 1-Butene, grams | 0.005 | 0.010 | 0.005 | 0.005 |
| millimoles | 0.089 | 0.178 | 0.089 | 0.089 |
| Et$_2$AlI, grams | 0.016 | 0.005 | 0.0016 | 0.010 |
| millimoles | 0.075 | 0.025 | 0.075 | 0.050 |
| WCl$_6$, grams | 0.009 | 0.009 | 0.006 | 0.006 |
| millimoles | 0.022 | 0.022 | 0.014 | 0.014 |
| Millimoles Al compound/mole monomer | 0.3 | 0.1 | 0.3 | 0.2 |
| Al/W molar ratio | 3.4 | 1.1 | 5.4 | 3.6 |
| Al or W compound added first | Al | Al | Al | Al |
| Time, Minutes | 7 | 65 | 3 | 1 |
| Polymer yield, grams | 4.2 | 4.9 | 1.8 | 4.1 |
| Wt.% | 23 | 23 | 10.1 | 23 |
| Wt% DCPD in polymer | 17 | 28 | 15 | 16 |
| IV | 2.99 | 2.19 | 5.10 | 2.42 |
| % Insoluble Polymer | 0 | 1.2 | 83 | 14 |

DCPD = dicyclopentadiene
E$_2$AlI = Diethylaluminum iodide
WIl$_6$ = tungsten hexachloride $$\text{Millimoles Al compound/mole monomer} = \frac{\text{millimoles of Et}_2\text{AlI}}{\text{moles of (cyclopentene + DCPD + 1-butene)}}$$

$$\text{Al/W molar ratio} = \frac{\text{millimoles of E}_2\text{AlI}}{\text{millimoles of WCl}_6}$$

The polymerizations in examples 1 and 2 occurred after an induction period of several minutes. Examples 1 and 2 illustrate production of a clear, smooth, gel-free, cyclopentene-DCPD copolymer in good yield with proper reactants and conditions (including an induction period) as described heretofore; 1-butene, diethylaluminum iodide and tungsten hexachloride (the latter in an ethylacetate/benzene solution) were used with suitable Al/monomer and Al/W ratios, and the diethylaluminum iodide was charged before the tungsten hexachloride. In contrast, the polymerizations in examples 3 and 4 occurred immediately and resulted in production of gelled, grainy polymer when $WCl_6$ was dissolved in benzene instead of an ethyl acetate/benzene solution.

The high cis-content polypentenamers are vulcanized readily to elastomers having excellent low temperature properties. The high trans-content polypentenamers are vulcanized readily to elastomers having outstanding physico-mechanical properties and high green strength comparable to that of natural rubber. Copolymers of cyclopentene and dicyclopentadiene can be oil-extended and vulcanized readily to form high tensile strength (at 25° C and 100° C) rubbers suitable for use in tires, particularly in truck tires, as well as in other rubber goods. Some cyclopentene-dicyclopentadiene copolymers not compounded with oil have plastic properties. A vulcanizing agent such as elemental sulfur or a thiuram di- or polysulfide and a broad range of accelerators and other compounding ingredients known to the art may be used together with the polymers produced by the process of this invention.

We claim:
1. A process comprising polymerization of cyclopentene with from 0% to about 98% by weight, based upon total polymer weight, of at least one other copolymerizable cycloolefin in the presence of
   1. a catalyst comprising (a) at least one compound selected from the group consisting of dialkylaluminum iodides, alkylaluminum diiodides and mixtures of trialkylaluminum compounds with iodine wherein each alkyl group contains from 2 to 8 carbon atoms, the catalytically effective amount of said dialkylaluminum iodide, alkylaluminum diiodide or trialkylaluminum is from about 0.1 to about 10 millimoles per mole of total cyclopentene and copolymerizable cycloolefin, and the molar ratio of elemental iodine to trialkylaluminum compound is from about 0.25/1 to about 6/1 moles per mole, and (b) at least one tungsten compound at a concentration from about 0.01 to about 1.0 molar in an ester solvent, said compound (a) being charged before said compound (b), and the molar ratio of (a)/(b) being from about 1/1 to about 80/1.
   2. at least one nonconjugated acyclic olefin containing from 2 to 12 carbon atoms and having at least one acyclic mono olefin or one hydrogen on each double-bonded carbon atom, said acyclic olefin being used in a molar ratio total cyclopentene and copolymerizable cycloolefin from about 0.0001/1 to about 0.3/1 mole per mole, and
   3. said ester solvent comprising at least one alkyl ester of a saturated carboxylic acid or dicarboxylic acid, said ester solvent containing from 2 to 20 carbon atoms and being substituted by 0 to 3 halogen atoms.

2. A process of claim 1 wherein said tungsten compound is a tungsten halide, the molar ratio of (a)/(b) is from about 1/1 to about 50/1 moles per mole, the molar ratio of elemental iodine to trialkylaluminum compound is from about 0.5/1 to about 3/1 moles per mole, said nonconjugated acyclic olefin is a 1-olefin or 2-olefin containing 2 to 8 carbon atoms, and said ester solvent contains from 2 to 10 carbon atoms and 0 or 1 bromine or chlorine atoms.

3. A process of claim 2 wherein said copolymerizable cycloolein is selected from the group consisting of (a) monocyclic monoolefins and diolefins containing from 4 to 12 carbon atoms and (b) bicyclic olefins containing from 7 to 16 carbon atoms and from 1 to 4 double bonds.

4. A process of claim 3 wherein said copolymerizable cycloolefin is a bicyclic olefin containing from 8 to 12 carbon atoms and 2 or 3 double bonds.

5. A process of claim 4 wherein said bicyclic olefin is dicyclopentadiene.

6. A process of claim 5 wherein there is used together with said ester solvent at least one cosolvent selected from the group consisting of (1) aliphatic or cycloaliphatic hydrocarbons containing 4 to 10 carbon atoms and (2) aromatic hydrocarbons containing 6 to 14 carbon atoms.

7. A process of claim 6 wherein the catalyst comprises (a) at least one compound selected from the group consisting of diethylaluminum iodide, ethylaluminum diiodide and a mixture of triethylaluminum and elemental iodine and (b) tungsten hexachloride.

8. A process of claim 7 wherein the catalyst comprises (a) at least one compound selected from the group consisting of diethylaluminum iodide and ethylaluminum diiodide and (b) tungsten hexachloride, said solvent is ethyl acetate, and said cosolvent is benzene or toluene.

9. A process of claim 5 wherein the catalyst comprises (a) at least one compound selected from the group consisting of diethylaluminum iodide, ethylaluminum diiodide, and a mixture of triethylaluminum and elemental iodine and (b) tungsten hexachloride.

10. A process of claim 9 wherein the catalyst comprises (a) at least one compound selected from the group consisting of diethylaluminum iodide and ethylaluminum diiodide and (b) tungsten hexachloride, and said solvent is ethyl acetate.

* * * * *